United States Patent [19]

Skierski

[11] 4,149,287
[45] Apr. 17, 1979

[54] METHOD AND APPARATUS FOR PINCH POINTING SCREW BLANKS

[75] Inventor: Edwin J. Skierski, Campbellsville, Ky.

[73] Assignee: USM Corporation, Farmington, Conn.

[21] Appl. No.: 855,664

[22] Filed: Nov. 29, 1977

[51] Int. Cl.$^2$ .............................................. B23G 9/00
[52] U.S. Cl. .............................................. 10/9; 10/21
[58] Field of Search ............. 10/2, 4, 9, 10 R, 20.5, 10/21, 169

[56] References Cited
U.S. PATENT DOCUMENTS

| 2,657,402 | 11/1953 | Poupitch | 10/20.5 X |
| 3,786,527 | 1/1974 | Morton et al. | 10/169 |
| 4,058,864 | 11/1977 | Moreland | 10/20.5 X |
| 4,071,918 | 2/1978 | Baer | 10/9 X |

Primary Examiner—E. M. Combs
Attorney, Agent, or Firm—Donald N. Halgren; Richard B. Megley; Vincent A. White

[57] ABSTRACT

A machine for producing points on the pilot end of a rotary fastener, the machine comprising a rotating dial for supporting an array of blank fasteners above a pair of dies. The blank fasteners are sequentially fed between the dies for pointing thereof. The dial is notched on its periphery to hold the blanks therein. The notches on the dial are acutely angled with respect to the axis of the dial and are secured thereagainst during the die pinching operation to prevent bending of the fasteners as they are pointed.

6 Claims, 8 Drawing Figures

METHOD AND APPARATUS FOR PINCH POINTING SCREW BLANKS

BACKGROUND OF THE INVENTION

(1) Field of the Invention

The present invention relates to machines for pinch pointing the pilot ends of metal screw blanks, and more particularly to an arrangement for holding the screw blanks in the machine as the blanks are pointed.

(2) Prior Art

It was the practice, in the prior art screw manufacture, to machine the cutting edges in the pilot end of a screw blank. It was a costly operation. Advances in the screw manufacture art introduced the use of dies to pinch or punch the cutting edges in screw blanks prior to their being threaded. Dies of this type are embodied in U.S. Pat. Nos. 3,395,603 and 3,398,413, both of which are assigned to the assignee of the present invention. The dies described therein are used on machines which utilize a process, wherein 300 to 700 screw blanks per minute may typically be fed to a rotating dial having notches in its periphery. The dial rotates with the blanks supported generally vertically in the notches, to successively bring the blanks between a pair of dies. A presser foot is activated to move radially inwards to keep the blank in its notch on the periphery of the dial, during the pinching operation. As the movable die closed on the pilot end of the blank and against the stationary die, the shaft and pilot end of the blank is pivoted, by necessity, about one-half of the blank diameter, out of the curvilinear plane defined by the circumference or periphery of the dial. This radially outward movement of the blank causes the bending of its shaft at the surface of the dies, if those blanks are roughly 1.9 cm. (about ¾") or longer.

It is an object of the present invention to provide a pointing machine that will pinch screw blanks without simultaneously causing a bending of the screw shaft.

SUMMARY OF THE INVENTION

The present invention comprises a pointing machine for producing points on screw blanks. The machine includes a rotatable dial having a plurality of generally axially aligned notches disposed on its periphery. The dial rotates to successively align screw blanks suspended in the notches, between a fixed and a movable die. A pressurized foot holds the screw blank in the notch as the dies pinch the pilot end of the blank. The notches may be angled in a range from about 3° to 8°, inwardly to the center of the dial, that is, they slope inwardly from the top side of the dial to the bottom side of the dial. The angle of the notch in the dial permits the fixed die to be disposed slightly more towards the center of the dial, wherein pinching of the screw blank between the dies, and the subsequent radially outwardly directed movement of the blank shaft, will not cause it to bend, but will permit the screw blank to remain straight for a later threading operation and subsequent drilling therewith.

BRIEF DESCRIPTION OF THE DRAWINGS

The objects and advantages of the present invention will become more apparent when viewed in conjunction with the following drawings, in which.

Description of the Preferred Embodiment

Figure 1A:
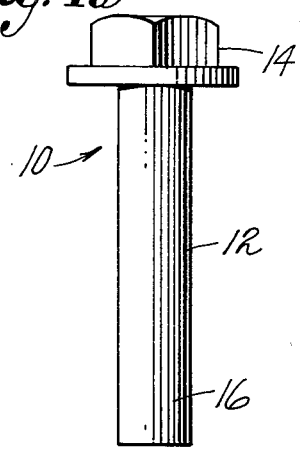
FIGS. 1A, B and C are side views of a screw blank, a pinch-pointed screw blank and a threaded screw, respectively, the first two showing the initial and final stages of operation on a screw blank of the present machine.

Referring to the drawings in detail, and particularly to FIG. 1A, there is shown a screw blank 10 having an elongated shank or shaft 12 and a head 14. Each screw blank 10 also comprises a pilot end 16, which is opposite to the head 14. The head 14 may be provided with any convenient means for cooperating with a tool for turning the screw to effect insertion or withdrawal thereof.

Figure 2:
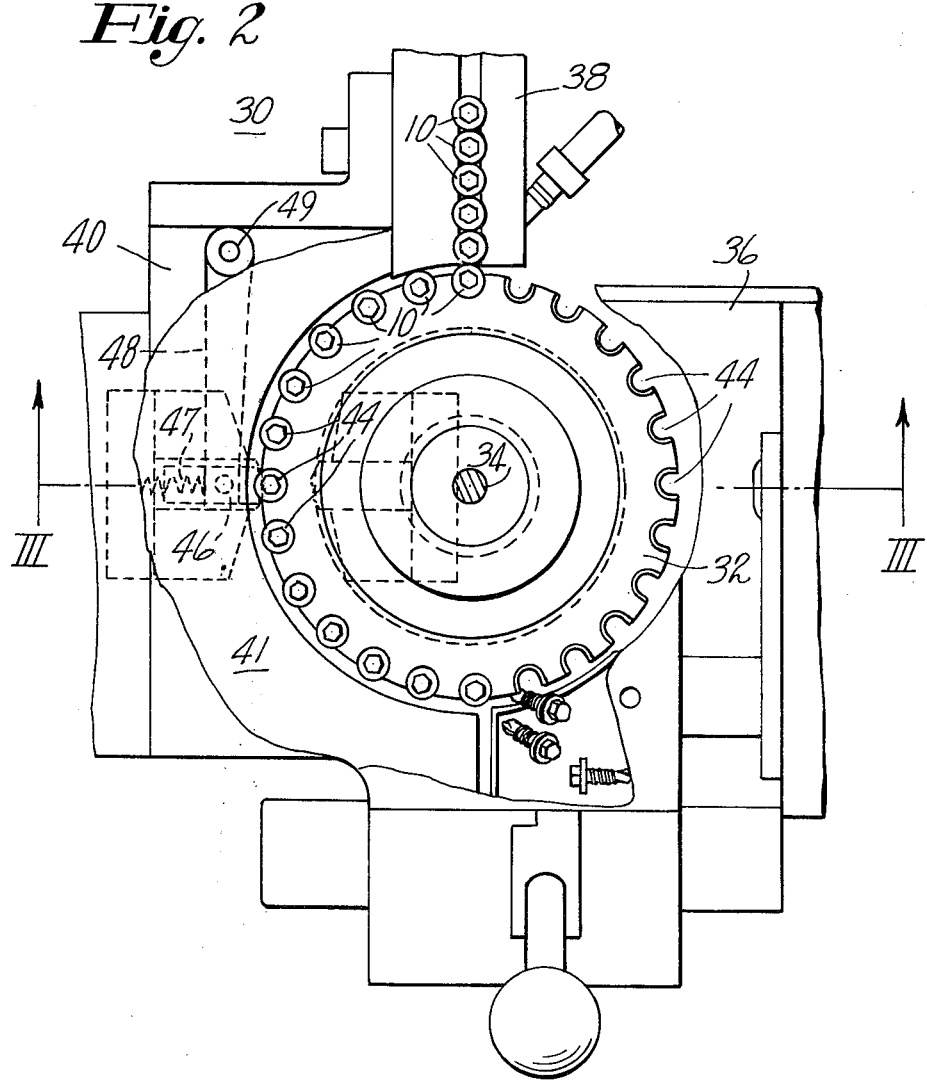
FIG. 2 is a plan view of a portion of a machine constructed according to the principles of the present invention.

The screw blanks 10 are processed in a pointing machine 30, which is partially shown in FIG. 2. The pointing machine 30 comprises a generally horizontally arranged dial or disc 32, rotatably disposed on a shaft 34, which extends through the upper surface of the dial 32. The shaft 34 is attached to a frame portion 36 of the machine 30. The dial 32 is driven by an indexing mechanism, not shown, included on the machine 30. The machine 30 also includes a supply chute 38 and a lower and an upper C-shaped retainer ring 40 and 41; respectively, disposed horizontally adjacent the dial 32.

The rotatable dial 32 has a plurality of generally axially disposed notches 44 arranged on its periphery. A biased foot 46 activatably disposed in the retainer ring 40. The biased foot 46 is arranged on the distal end of an arm 48 which pivots on a pin 49 secured to the lower retainer ring 40. The biased foot 46 is biased against the screw blanks 10 by a spring 47, or the like.

Figure 3:
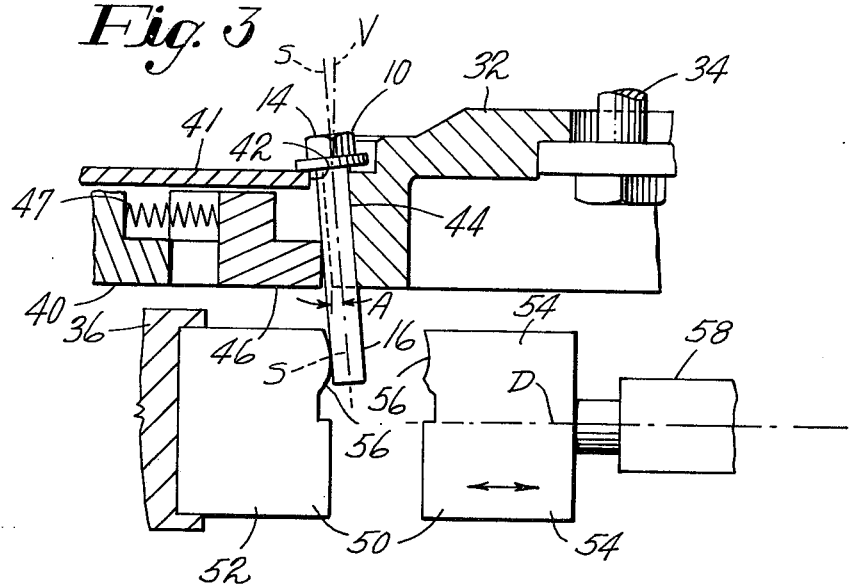
FIG. 3 is a view taken along the lines III—III of FIG. 2.
Figure 4:
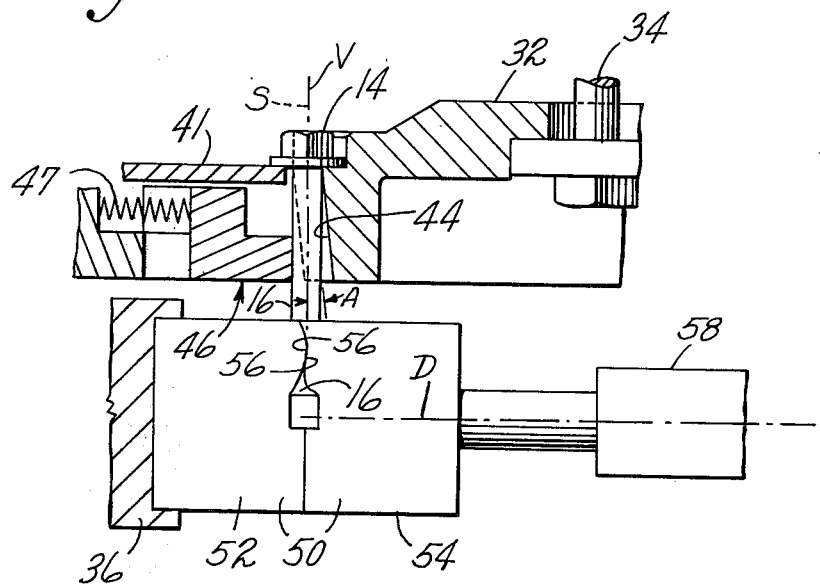
FIG. 4 is a view similar to FIG. 3, at a successive stage in the pointing operation.

In operation of the machine 30, a quantity of screw blanks 10 are guided down the supply chute 38 and are each received in one of the notches 44 as the notch rotatably passes the lower end of the supply chute 38. The dial 32 intermittently rotates, counterclockwise, in this example. The upper retainer ring 41 has a curved surface 42 which is spaced just apart from the periphery of the dial 32 to prevent the screw blanks 10 from falling from the notches 44 as they rotate in a circular path with the rotation of the dial 32. The intermittent rotation of the dial 32 permits each screw blank 10 supported thereby, to be arranged momentarily, between a pair of dies 50, spaced apart and then actuated, as shown in FIGS. 3 and 4, respectively. The pair of dies 50 include a fixed die 52 and a reciprocably movable die 54. The movement between the dies 52 and 54, defines an axis or locus of motion therebetween. The fixed die 52 is attached to a portion of the frame 36. Each die 52 and 54, has a tooled surface 56 which engages the shank and forms it to a point. The movable die 54 reciprocates by action of a pressurizable member 58, to cause the pair of dies 50 to pinch the pilot end 16 of each successive screw blank 10, as they each stop momentarily therebetween.

Each notch 44 in the periphery of the dial 32, is disposed therein so as to permit the pilot end 16 of the shank 12 of the screw blank 10, having an axis designated S, to be directed inwardly when held by the pressurized foot 46, at an angle A from vertical, designated V and which angles may range from about 3° to about 8°, which is only slightly askew from being parallel with the axis of rotation of the dial 32. The fixed die 52 is arranged under the dial 32, so that it is just contacting the surface of the pilot end 16 of the screw blank 10, the axis of the screw blank 10 being anywhere from about 3° to 8° from parallel with the axis of the dial 32, that is, both the screw blank 10 and the notch 44 are angled slightly towards the axis of rotation of the dial 32 to permit the axis of the shaft 12 to be predisposed at an angle of from 3° to about 8° to the locus of motion of the dies, 52 and 54, the preferred angle being 4°. The movable die 54 moves along an axis or locus of motion D which may correspond to movement radially outwards from the center of the dial 32, gripping and pinching the pilot end of the blank 10 between the dies 50. The dies 50 distort the end of the shank 12, causing it to be pressed outwardly against the features of the fixed die 52, and away from the notch 44. This is in effect, a pivoting of the screw blank 10 about its head portion 14, which is supported on the upper surface of the dial 32. This means that the axis of the blank 10 "S" and the vertical "V" become coaxial. This pivotal motion of the screw blank 10 may comprise about one-half the diameter of the shank 12.

Figure 5A:
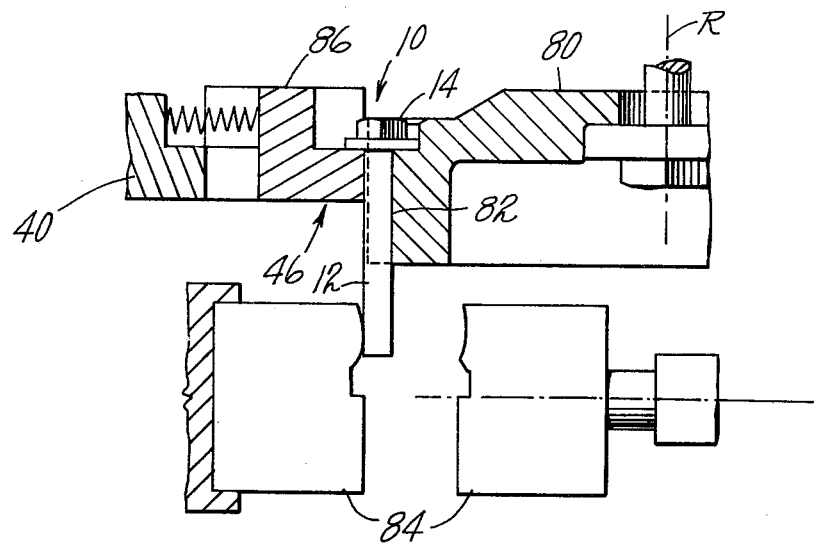
FIGS. 5A and B represent the prior art of the invention shown in FIGS. 3 and 4, respectively.
Figure 5B:
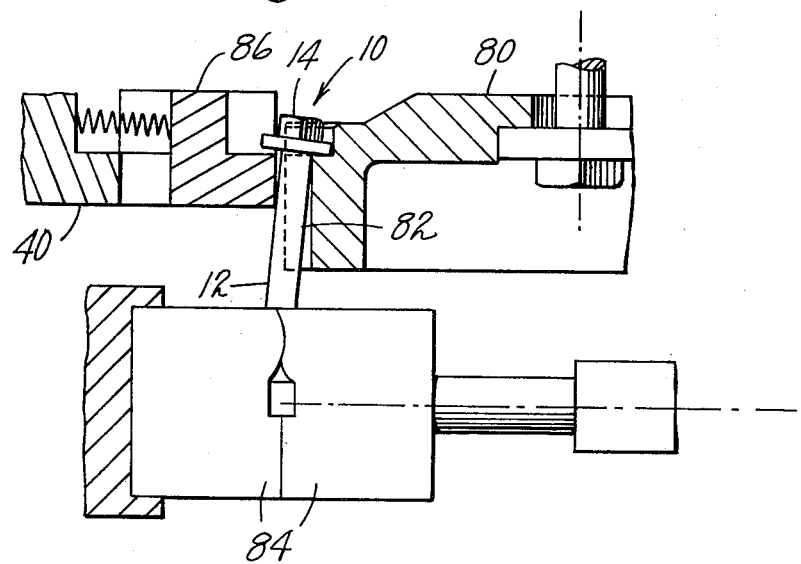

This pivotal motion is shown in FIGS. 5A and B wherein a prior art dial 80 has a notch 82 in its periphery, the notch 82 being parallel with an axis of rotation R of the dial 80. A screw blank 10 is supported in the notch 82 and is caused to pivot outwardly when pinched therebetween by a pair of dies 84, even though the screw blank 10 is pressed against the sides of the notch 80 by a pressure foot 86. The screw blank 10 is distorted by about one-half of its diameter and the shaft 12 is bent, as shown in FIG. 5B, because in the prior art there was no angular pre-allowance in the notch in the rotating dial 80 or other suspension means for supporting the screw blanks to compensate for the pivoting caused by the distortion of the shaft 12.

Figure 1B:
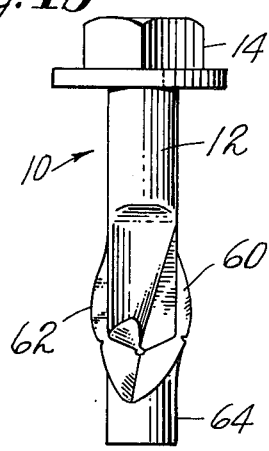

A properly pinched screw blank 10 of the present invention, however, is shown on FIG. 1B having a pair of ears 60 and 62, and a head 64 which all remain integral with the screw blank 10 after the die pinching operation. It is supported during manufacture, by the dial 32 in the notch 44, rotating therewith, until it passes the furthermost end of the retainer ring 40, whereupon, the pinched screw blank 10, is caused to drop into a collector bin 59, as shown in FIG. 2. The newly empty notches 44, thereupon intermittently rotate with the dial 32 to pick up new screw blanks 10 when they rotate to a position adjacent the supply chute 38.

Figure 1C:
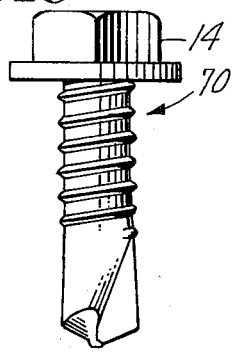

After the screw blank 10 is punched and removed from the present machine 30, it is threaded in a conventional manner and becomes a threaded fastener 70, as shown in FIG. 1C. The ears 60 and 62, and the head 64 are removed during the theading operation by threading instrumentalities. The ears 60 and 62 and the head 64 prevent abrasion of the cutting edges prior to the threading operation.

Thus, the present invention has presented a unique way of manufacturing pinch pointed screws while eliminating the occurrence of bends in the shafts due to the pinch pointing operation.

Having thus described my invention and what I claim as new and desire to secure as Letters Patent of the United States is:

1. A pinch pointing machine for pinch pointing screw blanks, said machine comprising:
   a pair of dies for pinch pointing screw blanks therebetween, at least one of said dies being movable toward the other of said dies;
   means for moving said movable die along a locus toward said other die; and
   means for supporting successive screw blanks between said pair of dies wherein the axis of any screw blank arranged therebetween is disposed at an angle of less than 90° to the locus of motion of said movable die, permitting a predetermined skewed angular relationship of the screw blank with respect to the pair of dies, to counteract any bending in the shaft of a screw blank during its pinching operation.

2. A pinch pointing machine for pinch pointing screw blanks, as recited in claim 1, wherein said means for supporting successive screw blanks between said pair of dies, comprises a dial rotatable about an axis, said dial having notches in its perimeter.

3. A pinch pointing machine for pinch pointing screw blanks, as recited in claim 2, wherein said notches are directed at a slight angle toward the axis of rotation of said dial.

4. A pinch pointing machine for pinch pointing screw blanks, as recited in claim 3, wherein said angle of said notches in the periphery of said dial may range from about 3° up to about 8° inwardly askew from parallel with the rotational axis of said dial.

5. A method of pinch pointing a screw blank comprising the steps of:
   providing a pair of dies, one of the dies being movable along an axis towards the other die for pinch pointing an extremity of a screw blank disposed therebetween;
   supporting the shaft of said screw blank at a predetermined obliquely arranged angle with respect to said axis of motion between said pair of dies and, pinch pointing the extremity of said screw blank between said dies whereby the oblique supporting angle of said shaft counteracts any bending of said shaft during the pointing operation.

6. A method of pinch pointing a screw blank, as recited in claim 5, including:
   arranging said predetermined angle of support of said screw blank so as to prevent said screw blank from bending during the pinching operation, said predetermined angle being oblique from normal with said axis of motion of said dies by at least one-half the diameter of said screw blank.

* * * * *